Fig. 1.

Jan. 25, 1938.  E. F. STOVER  2,106,194
GYROSCOPIC FLUID METER
Filed Dec. 20, 1935  4 Sheets-Sheet 2

FIG. 2.

Inventor:
Emory Frank Stover
By F. DeWitt Goodwin
Attorney

Jan. 25, 1938.  E. F. STOVER  2,106,194
GYROSCOPIC FLUID METER
Filed Dec. 20, 1935  4 Sheets-Sheet 4

Inventor:
Emory Frank Stover
By F. DeWitt Goodwin
Attorney

Patented Jan. 25, 1938

2,106,194

UNITED STATES PATENT OFFICE 2,106,194

GYROSCOPIC FLUID METER

Emory Frank Stover, Wynnewood, Pa.

Application December 20, 1935, Serial No. 55,319

44 Claims. (Cl. 73—206)

My invention relates to improvements in fluid meters adapted for use in connection with systems employing Venturi tubes, orifices, flow nozzles and Pitot tubes, or any other primary metering device in which the rate of flow is proportional to the square root of the differential pressure produced across such device and it is desired to obtain the rate of flow through a conduit in which the primary device is embodied and also the total flow through the conduit.

The object of my invention is to provide a novel meter which is efficient and accurate and relatively smaller in size than meters now in use for obtaining the above mentioned results.

A further object is to construct a meter embodying a gyroscope arranged for opposing the force, or differential pressure produced by the primary device.

A further object is to provide a rotatable frame, arrange a gyroscope upon the frame, provide mechanism by which the action of the gyroscope is opposed by the differential pressure produced by the primary device, and provide mechanism by which the gyroscope controls the rotation of the frame at a speed directly proportional to the flow through the primary device.

A further object is to provide a frame rotated by a motor, and arrange a gyroscope upon the frame for controlling the speed of rotation of the frame.

A further object is to provide an electric motor for rotating a frame, embody a gyroscope upon the frame, operatively associate the gyroscope with the primary metering device and with mechanism for opening and closing the electric circuit for controlling the speed of the motor.

A further object is to provide a motor, a frame, a clutch for engaging the motor for rotating the frame, embody a gyroscope upon the frame and oppose the action of the gyroscope by the differential pressure produced by the primary device for controlling the action of the gyroscope and provide mechanism actuated by the gyroscope for operating the clutch.

A further object is to provide novel mechanism directly associated with the motor for operating various devices for indicating, recording and integrating the flow through the primary device as obtained by the meter.

A further object is to provide means for transmitting to a distant point the results obtained by the meter for indicating, recording and integrating the flow through the primary device.

These together with various other novel features of construction and arrangements of the parts, which will be more fully hereinafter described and claimed, constitute my invention.

In carrying out my invention I employ the principle that the rate of flow through the primary device is proportional to the square root of the head, or differential pressure acting upon a diaphragm in a pressure responsive device, and the principle of mechanics relating to a gyroscope, which may be stated briefly as follows:

If a wheel is rotated about two axes at right angles to each other, it will exert a gyroscopic couple or torque about a third axis at right angles to the other two axes.

In the present embodiment in a meter the gyroscope wheel is mounted upon a frame which is rotated about an axis A, and by suitable gearing the wheel is rotated about an axis B, whereby a torque is produced about an axis C, which torque is proportional to the square of the speed of rotation of the frame about the A axis; therefore the speed of the frame will be a direct reading of the flow through the primary device when the torque is balanced against the differential pressure produced by the primary device, and any unbalance of said forces is arranged to regulate the speed of the frame to restore said balance.

Referring to the accompanying drawings:—

In the drawings, in which like reference characters refer to like parts, 10 represents a housing formed of a back wall 12 adapted to be secured in a fixed position, a front wall 13, a top wall 14, a bottom wall 15 and a horizontal bearing plate 16 which is connected with the bottom wall 15 by a web 17 and the front wall 13. Said plate 16 provides means for mounting the differential pressure responsive device 20 upon the housing 10.

The pressure responsive device 20 comprises a casing formed of two hollow sections 21 and 22 separated by a movable part 23, such as a diaphragm, and forming high and low pressure chambers 24 and 25. Secured upon opposite sides of the diaphragm 23 are clamp plates 26 and 27 to which a pull rod 30 is secured.

Figure 2:
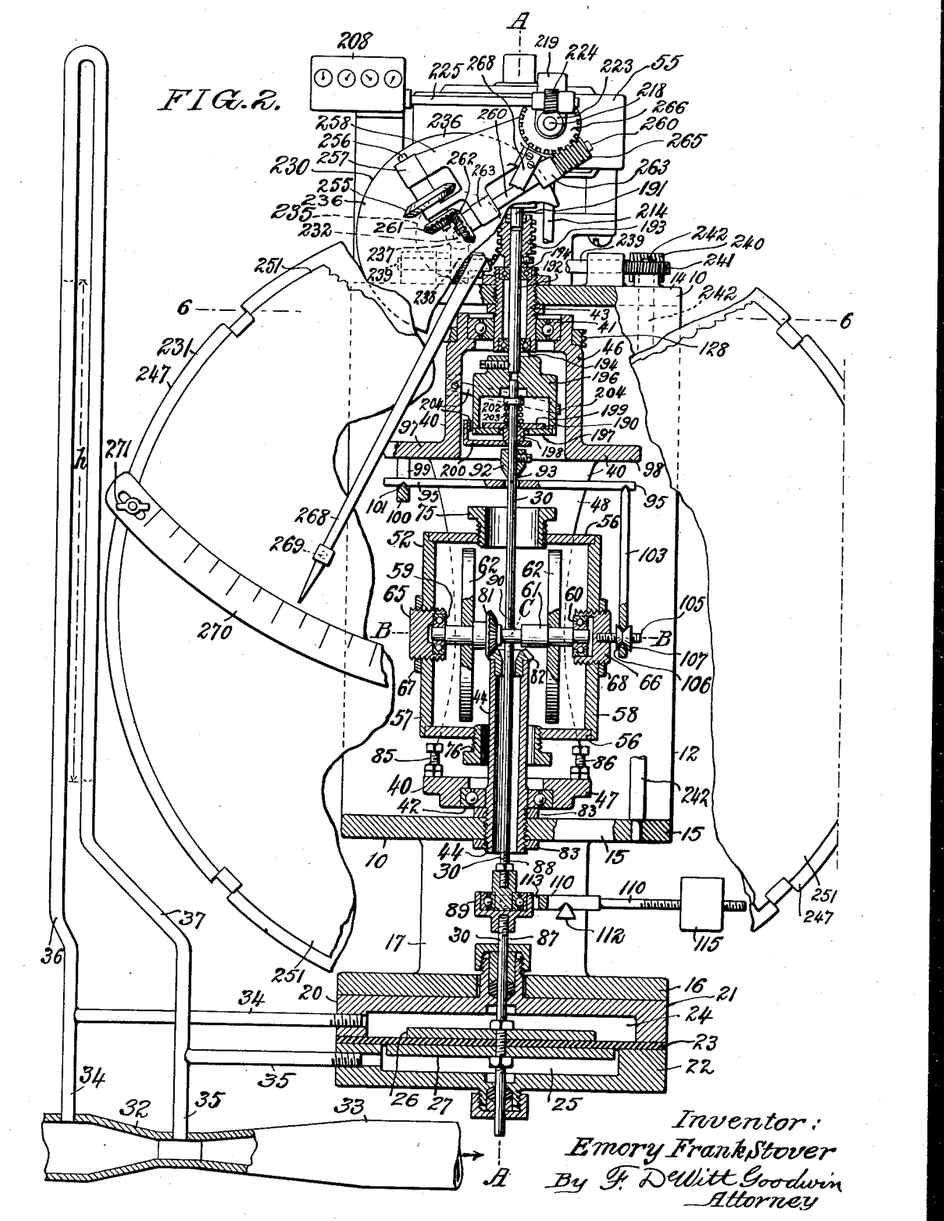
Fig. 2 is a vertical central sectional view, partly in elevation, showing my improved meter, and embodying a modified means for operating the rotatable frame.

A primary metering device in the form of a Venturi tube 32 is connected in a conduit 33 through which fluid is flowing in the direction indicated by the arrow. Pipes 34 and 35 are connected with the Venturi tube 32 and with the high and low pressure chambers 24 and 25, respectively, of the responsive device 20, so that a head or differential pressure is produced when fluid is flowing through the conduit 33, which head or pressure acts upon the diaphragm 23 and tends to move the latter and the rod 30. Fig. 2 shows gage glasses 36 and 37 connected with the pipes 34 and 35, and the pressure or head is indicated by the line $h$.

A primary metering device is thus formed in which the rate of flow $q$ varies as the square root of the head $h$.

A rotatable frame 40 is mounted upon bearings 41 and 42 which in turn are mounted upon sleeves 43 and 44 secured upon the top and bottom plates 14 and 15 of the housing.

Said frame 40 rotates upon said bearings 41 and 42 about a vertical axis A.

The rotatable frame 40 comprises heads 46 and 47 connected by outwardly curved walls 48. Said walls are provided with horizontal bearing screws, or conical shafts 50 and 51, between which shafts is mounted the gyroscope casing 52 which is free to tilt upon the axis C formed by said shafts 50 and 51.

Figure 1:
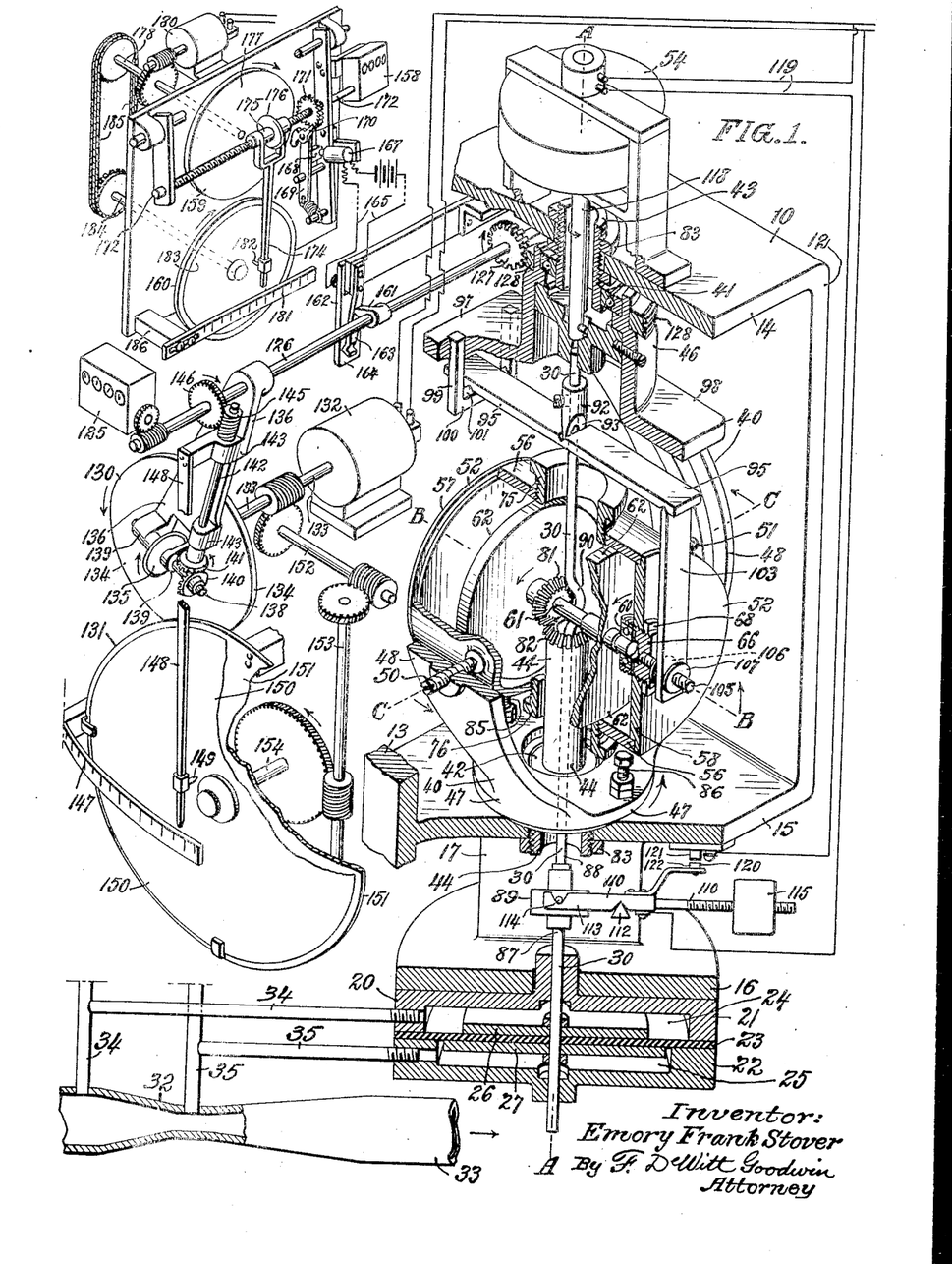
Fig. 1 is a diagrammatic view of a meter embodying my invention.
Figures 3, 4:
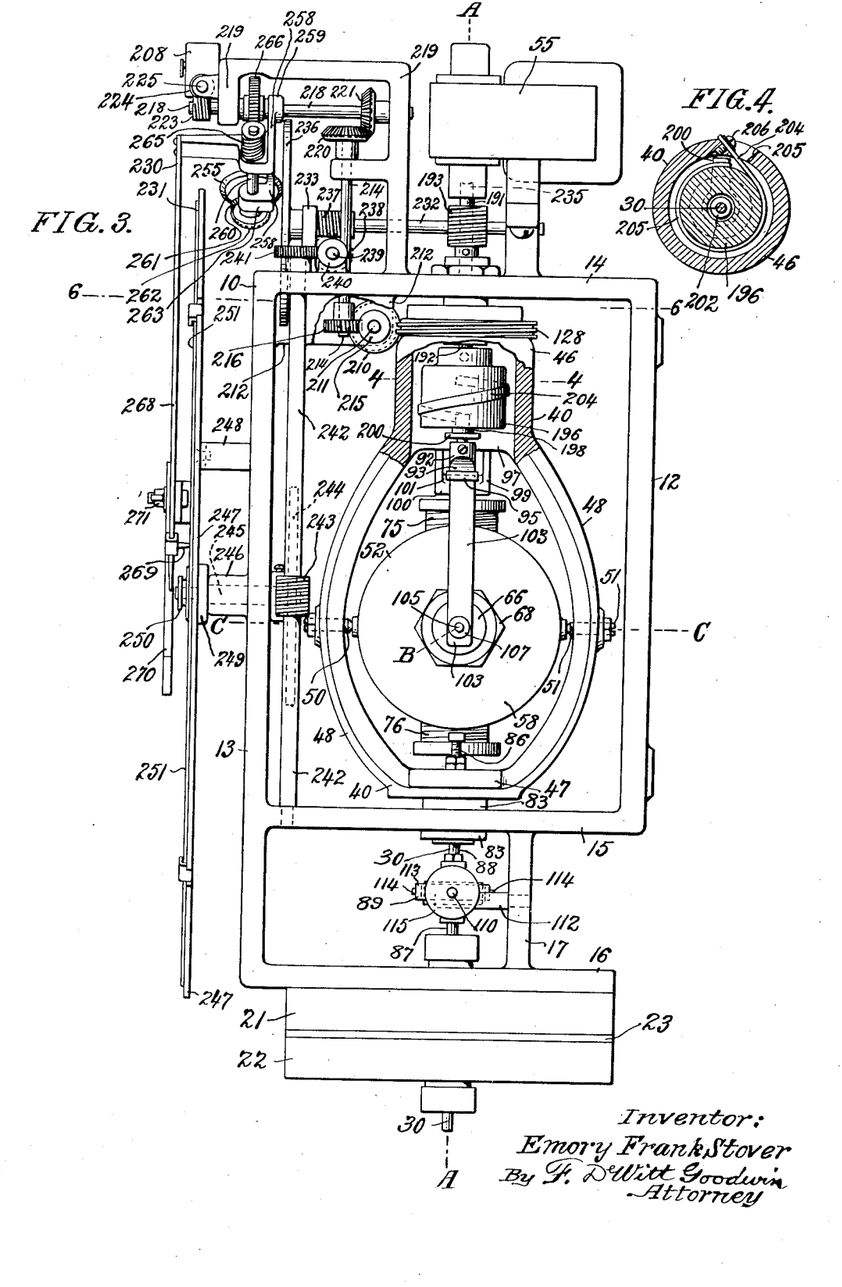
Fig. 3 is a side elevation, partly in section, of the meter shown in Fig. 2.
Fig. 4 is a horizontal section on line 4—4, Fig. 3.
Figures 5, 6, 7:
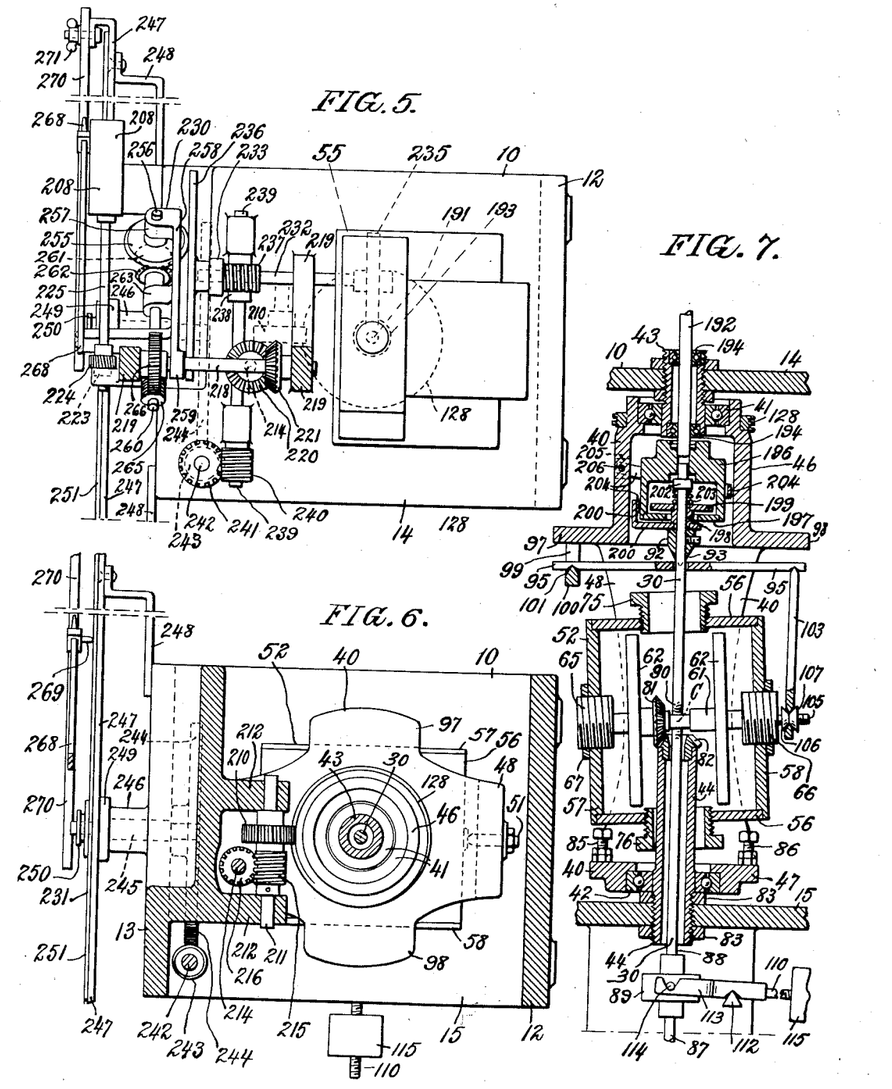
Fig. 5 is a plan view of Fig. 3.
Fig. 6 is a horizontal section on line 6—6, Fig. 3.
Fig. 7 is a partial sectional view similar to Fig. 2, showing the parts in a different position.

The frame 40 is rotated about the A axis by an electric motor 54 shown in Fig. 1, or by the motor 55 shown in Figs. 2, 3, and 5. The motor is mounted upon the top plate 14 of the housing 10, as hereinafter more fully described.

The gyroscope casing 52 consists of a cylindrical body portion 56 having oppositely positioned lugs to receive the conical ends of said shafts 50 and 51. The casing body portion has end walls 57 and 58, detachably secured thereto. Said end walls are provided with ball bearings 59 and 60, for a shaft 61 rotatably mounted within the casing 52, and rotatable on the B axis. Upon the shaft 61 are secured two wheels 62. Said wheels are located at equal distances from the A axis for reducing centrifugal thrust on the bearings 59 and 60.

Said end walls 57 and 58 are provided with bushings 65 and 66 formed with screw threads which engage the threaded apertures formed in said end walls 57 and 58, more clearly shown in Fig. 2. Said bushings have recesses occupied by the said bearings 59 and 60. The inner races of both bearings are rigidly secured upon the shaft 61. The outer race of the bearing 59 is fixed in the bushing 65. The outer race of the other bearing 60 is loose in the bushing 66. The bushing 65 is adjustable in the end wall 57 for positioning the wheels 62 with respect to the A axis. The other bushing 66 is adjustable in the end wall 58 so that the weight of the bushing 66 may be adjusted relatively to the casing 52 for varying the position of the center of gravity of the casing 52 and its contents along the B axis. The bushings 65 and 66 are secured in adjusted positions by lock nuts 67 and 68.

The casing 52 is provided with weights in the form of sleeves 75 and 76, having screw threaded portions which enter threaded apertures formed in the body portion 56 of the casing. Said sleeves are positioned in alignment with each other, and the axis extending through the sleeves is positioned at right angles to the B and C axes of the casing. By adjusting the sleeves 75 and 76 upon the body portion 56, the casing 52 and its adjuncts may be balanced so that when the frame 40 is revolving about the A axis the casing 52 will not tend to have any movement about the C axis due to centrifugal force, or inequality of mass moment of inertia about the A and B axes. By this arrangement the rotation of the casing 52 about the C axis is due only to gyroscopic action.

The wheels 62 are rotated about the B axis by means of a beveled gear wheel 81 adjustably secured on the shaft 61, which gear wheel meshes with gear wheel 82 secured upon said sleeve 44 which latter is secured in alignment with the A axis by rigidly securing the lower end of the sleeve in the bottom wall 15 of the housing. The sleeve 44 extends through an aperture formed through the bottom wall 15 of the housing. Said sleeve is adjustably secured upon the wall 15 by lock nuts 83 and permitting vertical adjustment of the sleeve.

The gear wheels 81 and 82 are formed with reduced root diameters so that the spaces between the teeth will have sufficient root depth to permit the gear wheels to have a slight relative movement when the shaft 61 tilts about the C axis, thus insuring the gear teeth will remain in mesh.

The gyroscope casing 52 is free to tilt about the C axis. Its tilting is limited by stop screws 85 and 86, adjustably secured in the lower head 47 of the revolving frame 40, as clearly shown in Figs. 1, 2, and 7.

A pull rod 30 extends freely through the sleeve 44. Said rod 30 is made in two sections 87 and 88 which are joined together by a thrust ball bearing coupling 89 arranged so that the lower section will not revolve and the upper section 88 can revolve with the frame 40. The entire pull rod 30 is movable longitudinally by the diaphragm 23, to which said rod 30 is attached. The section 88 of said rod is provided with a curved portion 90 which allows the rod to have a longitudinal motion and pass freely around the shaft 61 without touching the shaft. The gear wheel 82 is provided with a counterbore to provide room for the curved portion of the rod to clear the wheel 82.

The pull rod 30 has a sleeve 92 secured to the upper section of the rod. The sleeve 92 is formed at its lower end with a knife edge 93 which rests upon a lever 95, having a transverse slot to receive the knife edge of the sleeve 92 so that the sleeve and rod will rotate with the lever which is mounted on the revolving frame 40. The head 46 of the frame 40 is provided with oppositely projecting horizontal plates 97 and 98, one of which plates is provided with a depending yoke 99 having a horizontal member 100 provided with a knife edge 101 upon which one end of the lever 95 is pivotally supported. The under surface of the lever is provided with a transverse slot to receive the knife edge of the yoke. The yoke 99 causes the lever 95 to rotate with the frame 40.

The lever 95 has its free end supported upon a vertical bar 103, provided at its upper end with a knife edge which enters a slot formed in the under surface of the lever 95. The lower end of the bar 103 embraces a stud shaft 105, secured in the center of the end wall 58, of the gyroscope casing. Said shaft 105 is provided with a screw thread to receive conical nuts 106 and 107 which are located on opposite faces of the bar 103, thus permitting the lower end of the bar to be adjusted upon the shaft 105 for varying the length of the lever arm between the C axis and the bar 103.

The weight of the pull rod 30 and the weight of the movable member 23, and also the parts associated therewith, are counter-balanced by a counter-balance lever 110, pivotally mounted upon a knife edge bearing 112 secured in a vertical web 17 of the housing. One end of the lever 110 is provided with a yoke 113, engaged by stud shafts 114 secured in the casing of the coupling 89, which in turn is secured to the lower section 87 of the pull rod 30. The outer end of the lever 110 is provided with an adjustable weight 115.

If the weight 115 is placed further from the bearing 112 than the position required for exact balance it exerts a constant upward unbalanced force on the pull rod 30 and the diaphragm 23. The effect upon the meter of this force is equivalent to a subtraction of a constant value from all differential pressures applied to the diaphragm, being a small percentage of large differential pressures and a large percentage of small differential pressures.

The effect of such alteration of differential pressures is to make the meter follow the relation between discharge and differential pressure of the primary device 32 when it departs slightly from the square root law.

The adjustment above mentioned would be applied in case of Venturi tubes, flow nozzles and Pitot tubes. For orifices the counter-weight 115 would be set closer to the bearing 112 than exact balance required.

In the form illustrated in Fig. 1 the shaft 118 of the motor 54 is coupled directly with the head 46 of the rotating frame 40. The motor circuit 119 is controlled by a switch 120 having contact plates 121 and 122. The latter plate 122 is mounted upon the counter-balance lever 110 so that when the diaphragm 23 is depressed by differential pressure the switch 120 will be closed and the motor will be energized and rotate the frame 40 carrying the gyroscope casing 52. The rotation of the frame 40 about the A axis will cause the gear wheel 81 to travel around the stationary gear wheel 82 so that the gear wheel 81 will be rotated and in turn rotate the shaft 61 and the wheels 62 about the B axis.

When the frame 40 is rotating about the A axis the gyroscope casing 52 carrying the wheels 62 will be rotated about the A axis, and said wheels 62 will also be rotated about the B axis and thus have a relative rotation, or an equal rotation if the gear wheels 81 and 82 are of the same size. A torque is thus produced about the C axis which tends to rotate, or tilt the casing 52 about the pivot shafts 50 and 51, corresponding to the C axis. This torque produces a thrust through the bar 103 to the lever 95 and an upward force on the knife edge of the sleeve 92 secured on the pull rod 30, which thrust acts against the differential pressure acting downwardly upon the diaphragm 23 of the pressure responsive device 20.

When the force produced by the torque exceeds the force of the differential pressure acting upon the diaphragm, the pull rod will be moved upwardly and the counter-balance lever 110 will be moved by the rod 30 and actuate the switch 120 for opening the circuit 119 thus allowing the motor to idle. As soon as the speed of the rotating frame 40 is reduced the torque will be reduced until the force produced by the torque is less than the force of the differential pressure acting upon the diaphragm, when the latter will again be depressed and close the switch 120 and again energize the motor 54.

The balancing of the force produced by the differential pressure with the force produced by the gyroscopic couple will cause the motor 54 to rotate the frame 40 at a speed corresponding to the rate of flow of fluid through the conduit, and the speed of rotation of the frame 40 is a direct measure of the rate of flow through the primary device 32.

An integrating device or revolution counter 125 is operated by a shaft 126, having a worm wheel 127 secured thereon and meshing with a worm 128 secured on the head 46 of the rotatable frame 40. The counter 125 will thus be operated by the revolutions of the frame and register in units of volume, or weight, of the total flow of fluid through the conduit 32.

The indicating and recording devices 130 and 131 illustrated in Fig. 1, include a separate motor 132 which rotates at a uniform speed. A shaft 133 from the motor 132 rotates a disk 134. A friction driven wheel 135 is mounted upon a swinging plate 136, which plate is loosely mounted on the shaft 126. The plate 136 is positioned in front of the disk 134 and the wheel 135 is in frictional engagement with the disk. When the wheel 135 is moved away from the center of the disk it will be rotated by the disk at a speed dependent upon the distance the wheel is moved from the center of the disk. A shaft 138, on which the wheel 135 is secured, is rotatably mounted in bearings 139 on the plate 136. Upon the shaft 138 is secured a bevel gear 140, which meshes with a similar gear 141 secured on a shaft 142 rotatably mounted in bearings 143 on the plate 136. A worm 145 is secured on the shaft 142 and meshes with a worm wheel 146 secured on the shaft 126. The rotation of the disk 134 rotates the wheel 135 in a direction which will screw the worm 145 around the periphery of the worm wheel 146 and tends to swing the plate 136 in a direction to position the wheel 135 adjacent to the center of the disk 134. When the frame 40 is rotating the shaft 126 will rotate the worm wheel 146, said wheel 146 engages the worm 145 and swings the plate 136 and the wheel 135 away from the center of the disk 134 to a position upon the disk in which the wheel 135 will be rotated at a speed which will rotate the worm 145 relatively to the worm wheel 146 until the relative speeds of the shaft 126 and the disk 134 will position the wheel 135 at a position upon the disk which will indicate the rate of speed of the frame 40.

A pointer 148 is secured upon the plate 136. The pointer swings adjacent to a scale plate 147 which is graduated to indicate the rate of flow of fluid through the conduit 32.

The pointer 148 is provided with a pen 149 which is arranged to mark upon a chart 150 for recording the flow through the conduit. The chart 150 is positioned in front of a fixed guide plate 151. The chart 150 is rotated at a constant speed by the motor 132 through shafts 152, 153, and 154 provided with suitable gearing.

Integrating, indicating and recording devices 158, 159 and 160, respectively, are shown in Fig. 1, which are adapted to be located at a distance from the meter for showing the results obtained by the latter. The shaft 126 is driven at a speed proportional to the rotation of the meter frame 40 and corresponding to the rate of flow. Said shaft 126 is provided with a cam 161 for operating a switch 162 by closing switch plates 163 and 164 forming part of an electric circuit 165 extending to a distant point from the meter. A magnet 167 is included in said circuit and is arranged for moving an armature 168 secured on a spring retained lever 169 and carrying a pawl 170, which latter engages a ratchet wheel 171 secured on a shaft 172.

The shaft 172 operates the revolution counter 158, which registers the number of revolutions of the meter frame 40 or the total flow through the system.

The indicating and recording devices include a pointer 174 which is movably mounted upon the shaft 172, which shaft is rotated intermittently by the impulses of the magnet 167. The shaft 172 is threaded and is embraced by a threaded hub 175 of a wheel 176, which wheel is driven by a disk 177 with which the periphery of the wheel 176 is in frictional engagement. The disk is secured upon a shaft 178 which is rotated at a uniform speed by a motor 180. Said disk 177 tends to rotate the wheel 176 in a direction to move the pointer 174 along the shaft 172 toward the center of the disk 177 and to a position where the speed of rotation of the threaded shaft 172 by the action of the magnet will equal the speed of the disk, so that the position of the pointer 174 will indicate the rate of flow upon a graduated scale plate 181.

The pointer 174 is provided with a pen 182 for recording the flow upon a chart 183 which is rotated by a shaft 184. Said shaft 184 is rotated by the shaft 178 through a chain belt 185. The graduated plate 181 for indicating the rate of flow is adjustably mounted upon a fixed post 186 by suitable adjusting means.

Figs. 2 to 7 illustrate a form of my invention in which the motor 55 is connected through a clutch 190 for rotating the frame 40. The motor rotates at a constant speed, higher than the maximum speed of the frame.

The motor shaft 191 is detachably coupled with a shaft 192 by means of a worm sleeve 193. The shaft 192 is rotatably mounted in ball bearings 194 located in the opposite ends of the sleeve 43. The lower end of the shaft 192 is secured to a drum 196 which is freely rotatable within the hollow head 46. A head plate 197 is secured in the lower end of the drum and forms one friction plate of the clutch.

The pull rod 30 extends through a central hole formed in the plate 197. The upper end of the rod is loosely guided in the upper portion of the drum 196.

A hub 198 loosely surrounds the pull rod 30. A clutch plate 199 is secured to the end of the hub 198 which extends into the drum 196. An arm 200 is secured to the lower end of the hub 198. A downward pull upon the rod causes the plate 199 to come into contact with the plate 197 of the driven drum 196, thereby rotating the arm 200. The hub 198, plate 199 and the arm 200 are rigidly secured together. The rod 30 has a nut 202 secured thereon and a spring 203 is interposed between the nut and the hub 198, so that an excessive force applied to the rod will be absorbed by the spring, thus insuring the clutch plates from being damaged.

When the arm 200 is rotated by the clutch drum 196 the motion of the drum is imparted to the frame 40 through a flexible snubbing band 204 which surrounds the drum 196. One end of the band is attached to the outer end of the arm 200 and its other end is secured to the head 46 of the frame, as shown in Fig. 4. The outer end of the band 204 extends through an opening 205 formed through the cylindrical wall of the head 46 and is secured to the latter by a screw 206. The head of the screw 206 is accessible from without the frame 40, whereby the parts may be readily assembled.

When the differential pressure upon the diaphragm 23 causes a downward force upon the rod 30, the clutch plate 199 will be moved into contact with the plate 197 of the drum, as shown in Fig. 2. The drum 196 is driven continuously by the motor 55. The arm 200 is rotated by the hub 198 secured to the plate 199 and the arm 200 snubs the band 204 around the drum and tends to rotate the frame 40 with the drum. The speed of the frame 40 increases until the downward force upon the pull rod 30 is exceeded by the upward force applied to the lever 95 by the torque produced by the gyroscope, which torque is increased when the speed of rotation of the frame is increased. The upward force thus applied to the lever 95 and the rod 30 causes the clutch plates 197 and 199 to be disengaged, as shown in Fig. 7, and the snubbing action of the band 204 is released from the drum, thus allowing the speed of the frame to be reduced to a speed directly proportional to the rate of flow through the primary device 32. The speed of the rotatable frame 40 oscillates about a value corresponding to the rate of flow through the primary device.

The revolution counter, or integrating edvice, shown in Figs. 2, 3, and 5 is operated by the worm 128 which is secured on the head 46 of the rotatable frame. As clearly shown in Figs. 3 and 6, the worm 128 meshes with a worm wheel 210, secured on a shaft 211, rotatably mounted in bearings 212 formed on the housing 10. The shaft 211 drives a vertical shaft 214 by means of a worm 215 and a worm wheel 216.

A horizontal shaft 218 is mounted in a bearing bracket 219, as shown in Figs. 3 and 5. The shaft 214 rotates the shaft 218 through bevel gears 220 and 221. The shaft 218 has a worm 223 secured thereon which meshes with a worm wheel 224, secured on a shaft 225 which operates the integrating device, or revolution counter 208.

An indicating device 230, and a recording device 231 are also operated by the shaft 218 in conjunction with a shaft 232, which latter is rotated by said worm sleeve 193 rotated by the shaft 191, which in turn is rotated at a constant speed by the motor 55. The shaft 232 is mounted upon a bearing formed on the bracket 219, and a bearing 233 on the top plate 14 of the housing. Said shaft 232 is rotated by a worm wheel 235, which meshes with the worm sleeve 193. A friction drive disk 236 is secured upon one end of the shaft 232. A worm 237 is also secured on shaft 232 and meshes with a worm wheel 238 secured on a horizontal shaft 239 having a worm 240 which meshes with a worm wheel 241 secured on a vertical shaft 242 rotatable upon bearings formed by the plates 14 and 15 of the housing, as shown in Fig. 3. The shaft 242 has a worm 243 secured thereon which meshes with a worm wheel 244 secured on horizontal shaft 245 which is rotatable on a bearing 246 formed upon the front wall 13 of the housing. Said shaft 245 extends through a face plate 247 mounted on brackets 248 secured upon the front wall 13. Said shaft 245 has a head 249 and a thumb nut 250 for clamping thereon a chart 251 which is rotated at a uniform speed over the face plate 247 by the motor 55.

The disk 236 is also rotated continuously by the motor 55, and rotates a friction wheel 255 which engages the face of the disk 236. The wheel 255 is secured on a shaft 256 mounted in bearings 257 on a swinging plate 258 having a hub 259 loosely mounted upon the shaft 218 which is rotated by the frame 40. The shaft 256 carrying the friction wheel 255 rotates a shaft 260 by means of gears 261 and 262. Said shaft 260 is mounted in bearings 263 formed on the swinging plate 258. A worm 265 is secured on the shaft 260 and meshes with a worm wheel 266 secured on the shaft 218. A pointer 268 is secured on the swinging plate 258 and swings over the chart 251. A pen 269 is mounted upon the pointer for making a record upon the chart. A scale plate 270 showing the rate of flow is located adjacent to the free end of the pointer. Said plate 270 is adjustably secured by a thumb nut 271 on the face plate 247.

The disk 236 rotates the friction wheel 255 in a direction which will cause the worm 265 to move around the periphery of the worm wheel 266 in a direction which will swing the plate 258 to a position in which the friction wheel tends to come to rest at the center of the disk 236. When the shaft 218 is rotated by the rotatable frame 40, the worm wheel 266 tends to carry the worm 265 and the plate 258 in a direction which will cause the friction wheel 255 to move away from the center of the desk 236, until the speed of the disk and the speed of the shaft 218 coincide, thus causing the pointer 268 to oscillate about a value corresponding to the rate of flow through the primary device. The position of the pointer relative to the scale plate 270 shows the rate of flow, and the pen 269 upon the pointer records the flow upon the chart 251.

In the operation of this meter the center of gravity of the tilting mass supported on the pivots 50 and 51 of axis C must lie on the intersection of axes A and C. If the center of gravity were not on axis C the casing 52 and its contents would not be in static balance about axis C and would exert a force on the pull rod 30, even at zero speed. If the center of gravity were not on axis A it would constitute a revolving eccentric mass and the centrifugal force resulting would tend to tilt the casing 52 until the center of gravity lay on the resultant of the centrifugal force and the force of gravity. In this position the casing would resist any force tending to displace it and hence would not be properly responsive to the gyroscopic effect.

Any centrifugal action is therefore harmful, as it prevents proper functioning and must be eliminated by adjustment of the balancing masses, which is done in the following manner; after the shaft 61 and the wheels 62 have been properly located by adjusting the bushing 65 upon the casing 52 and the bushing secured by the lock nut 67, the casing is mounted on the rotating frame 40 by the pivot shafts 50 and 51, which form the C axis of the casing, and the entire casing is supported on the C axis with the axes B and C horizontal. The frame 40 is then tapped to eliminate static friction in the pivot shafts 50 and 51. The bushing 66 is adjusted upon the casing 52 along the B axis until the casing shows no tendency to rotate on the C axis, which means that the center of gravity is on a vertical line through the C axis. The housing and the frame 40 are then turned bodily until the axes A and C are horizontal and the B axis is vertical. The sleeves 75 and 76 are adjusted, upon the casing 52, along the axis A. Either sleeve is moved until tapping upon the frame 40 produces no rotation of the casing upon the C axis, which means that the center of gravity lies on the intersection of axes A and C, as required. This eliminates tilting effects due to gravity and eccentric mass or centrifugal force.

The housing and frame 40 are now mounted in an erect position with the A axis positioned vertically. In the operation of the meter the casing 52 tilts on the C axis and therefore the casing also tilts relatively to the A axis. The axis of the casing which coincided with the A axis in the erect position of the casing is tilted at a slight angle to the A axis, which new position of the axis of the casing may be called axis $A^1$. The $A^1$ and the B axis are at right angles to each other and their plane still contains the A axis, the axis of rotation of the frame 40.

There is another effect due to unequal moment of inertia of a mass about two perpendicular axes the plane of which contains the axis of rotation of the mass, which effect must be eliminated.

This action of the revolving mass is more fully described in "Gyrodynamics" by Ferry, page 16 article 14 last paragraph. (Published by John Wiley & Sons, Inc.)

Thus if the moments of inertia of the tilting mass about the axes A and B are not equal, rotation about an axis in their plane will cause tilting about the axis C. To eliminate this effect the sleeves 75 and 76 are adjusted both outwardly or both inwardly by the same amount so as not to shift the center of gravity along the A axis or change the moment of inertia about the A axis, but to increase or decrease the moment of inertia about the B axis until it equals that about the A axis.

To check this adjustment the tilting casing 52 is supported on the pivot shafts 50 and 51. The stationary gear 82 is removed and the wheels 62 are locked relatively to the casing. The frame 40 and the casing 52 are now spun on the A axis. If the casing does not tilt on the C axis the adjustment is correct. The sleeves 75 and 76 are then fixed in position permanently upon the casing. The stationary gear 82 is replaced and the wheels 62 are released. When the meter is in operation the gyroscopic action occurs and it will be entirely unaffected by centrifugal force.

In any square root primary device, such as the Venturi tube 32, the flow $q$, per second, equals a constant times the square root of the differential pressure $h$.

In the operation of the present meter said pressure $h$ is applied to the pressure responsive device 20 of a given effective area D, whereby a force is produced on the diaphragm and said force acts downwardly upon the pull rod 30.

The downward force upon the pull rod causes the motor to rotate the rotatable frame 40, either by closing the switch 120, Fig. 1, or by engaging the clutch 190, Figs. 2 to 7.

The rotation of the frame 40 about the A axis carries with it the casing 52 upon which is mounted the shaft 61. The bevel gear 81 secured on the shaft 61 travels around the stationary gear 82 and imparts rotation to the shaft 61 and to the wheels 62 about the B axis, at a speed having a constant ratio to the speed of the frame 40. The rotation of the frame and casing about the A axis is represented by $W_A$ and the rotation about the B axis is represented by $W_B$. $W_A$ and $W_B$ represent the angular velocities of the wheels 62 about axes A and B.

If the wheel, (hereinafter used to designate the wheels 62), is turned about the A axis and at the same time is turned about the B axis it will exert a torque about a third axis C, which is coaxial with the shafts 50 and 51 on which the casing 52 is pivotally mounted. The magnitude of this torque is proportional to the mass moment of inertia of the wheel about axis B and to the product of the angular velocities about the axes A and B.

T equals the torque about axis C.

I equals the mass moment of inertia of the wheel about axis B, $W_A$ and $W_B$ the angular velocities of the wheel about axes A and B, then the algebraic statement of the relation is:—

$$T = I W_A W_B \qquad \text{Equation 1}$$

If $W_A$ and $W_B$ are made to have a constant ratio R, $$R = \frac{W_A}{W_B} \text{ or } W_A = R W_B$$

$$T = I \frac{W_A^2}{R} = I R W_B^2 \qquad \text{Equation 2}$$

At a definite distance L, from the axis C to the bar 103, the torque T represents a force $F_1$ equal to $$\frac{T}{L}$$

since torque is by definition the product of a force and a lever arm. Hence:—

$$T = F_1 L$$

or $$T = F_1 L = I R W_B^2 \qquad \text{Equation 3}$$

$$F_1 = \frac{I R}{L} W_B^2 \qquad \text{Equation 4}$$

In the primary device 32 the rate of flow $q$, in cubic units per second, or units of weight per second, equals a constant times the square root of the differential pressure $h$:—

$$q = K \sqrt{h}$$

or $$h = \frac{q^2}{K^2} \qquad \text{Equation 5}$$

The differential pressure $h$ is applied to the pressure responsive device having a diaphragm of a given effective area D, a total force is produced upon the diaphragm and upon the pull rod:—

$$F_2 = h D$$

Then $$F_2 = h D = \frac{D q^2}{K^2} \qquad \text{Equation 6}$$

If now the total force $F_2$ and $F_1$, (Equation 4), are balanced against each other:—

$$F_2 = \frac{D q^2}{K^2} = F_1 = \frac{I R}{L} W_B^2$$

or $$\frac{D q^2}{K^2} = \frac{I R}{L} W_B^2 \qquad \text{Equation 7}$$

$$q^2 = \frac{I R K^2}{L D} W_B^2$$

or $$q = K \sqrt{\frac{I R}{L D}} W_B \qquad \text{Equation 8}$$

Since K, I, R, L, and D are all constants they can be represented by a single constant M, and $q$ equals $M W_B$ or the speed of the rotatable frame as controlled by the gyroscope is proportional to the rate of flow through the primary device.

The speed of rotation of the frame 40 is increased by the motor 54, or motor 55. As the speed of the frame increases, the speed of the wheel 62 also increases until the gyroscopic action produces sufficient force $F_1$ (Equation 4) to move the bar 103 upwardly against the lever 95 and lift the rod 30 upwardly against the force $F_2$ (Equation 6) produced by the differential pressure acting downwardly upon the diaphragm. The upward movement of the rod 30 releases the rotatable frame 40 from the action of the driving motor by opening the switch 120, Fig. 1, or releasing the clutch 190 Fig. 2.

When the driving action of the motor is released from the frame 40, the speed of the frame is diminished, thus reducing the gyroscopic force $F_1$ until the upward force acting through the bar 103 and the lever 95 is less than the downward force $F_2$ of the diaphragm acting upon the pull rod and upon the lever. When the reduced gyroscopic action or force $F_1$ is overcome by the downward pressure upon the diaphragm or force $F_2$, the rod 30 will be moved downwardly and cause the motor to again increase the speed of the frame 40.

The frame 40 is thus caused to rotate at a speed which will make the force $F_1$ equal the force $F_2$ as in Equation 7. These forces will be balanced and the speed of the rotatable frame will be a direct measure of the rate of flow as in Equation 8.

A more scientific explanation of the principle of the gyroscope may be found in "Analytical Mechanics for Engineers" by Seely and Ensign, (second edition) pages 346 to 357, published by John Wiley & Sons, Inc.

Various changes in the arrangement and the construction of the parts may be made without departing from my invention.

I claim:—

1. A meter comprising a rotatable frame, means for rotating said frame, a gyroscope operatively mounted upon said frame and arranged for producing a gyroscopic force, means operatively associated with the gyroscope for rotating the latter at a speed proportional to the speed of the frame, a member subjected to a variable force and opposed by force produced by the gyroscope, and means associated with said first named means and actuated by said member for controlling the speed of rotation of said frame and arranged for maintaining said forces in balance.

2. A fluid meter comprising a rotatable frame, means for rotating the frame, means associated with said first named means for controlling the speed of rotation of the frame comprising a gyroscope operatively mounted upon the frame and arranged for producing a gyroscopic force, means operatively associated with the gyroscope for rotating the latter at a speed proportional to the speed of the frame, and structure subjected to a force substantially proportional to the square of the rate of flow of a fluid opposing the force produced by the gyroscope.

3. A fluid meter comprising a rotatable frame, means for rotating the frame, means for controlling the speed of rotation of the frame comprising a gyroscope operatively mounted upon the frame and arranged for producing a gyroscopic force, means operatively associated with the gyroscope for rotating the latter at a speed proportional to the speed of the frame, structure subjected to a force substantially proportional to the square of the rate of flow of a fluid opposing the force produced by the gyroscope, and means responsive to the revolutions of the frame and operatively associated with the latter.

4. A fluid meter comprising a rotatable frame, means for rotating the frame, means associated with said first named means for controlling the speed of rotation of the frame comprising a gyroscope operatively mounted upon the frame and arranged for producing a gyroscopic force, means operatively associated with the gyroscope for rotating the latter at a speed proportional to the speed of the frame, structure subjected to a force substantially proportional to the square of the rate of flow of a fluid opposing the force produced by the gyroscope, and flow indicating means responsive to the revolutions of said frame.

5. A fluid meter comprising a first named means for causing a differential pressure proportional to the square of the rate of flow of fluid, a second means responsive to the differential produced by said first means, a rotatable frame, means for rotating the frame, a gyroscope operatively mounted upon said frame, said gyroscope adapted to exert a force on said second means in opposition to the force due to the differential pressure, means operatively associated with the gyroscope for rotating the latter at a speed proportional to the speed of the frame, and means associated with said means for rotating the frame and controlled jointly by said second means and the force produced by the gyroscope to vary the speed of rotation of the frame to balance said forces on the second means.

6. A fluid meter comprising a first named means for causing a differential pressure proportional to the square of the rate of flow of fluid, a second means responsive to the differential produced by said first means, a rotatable frame, means for rotating the frame, a gyroscope operatively mounted upon said frame, means operatively associated with the gyroscope for rotating the latter at a speed proportional to the speed of the frame, said gyroscope adapted to exert a force on said second means in opposition to the force due to the differential pressure, means associated with said means for rotating the frame and controlled jointly by said second means and the force produced by the gyroscope to vary the speed of the frame to balance said forces on the second means, and indicating means operatively associated with said frame and adapted to indicate the number of rotations of the frame.

7. A meter comprising a rotatable frame, means for rotating said frame, a gyroscope operatively mounted upon said frame and arranged for producing a gyroscopic force, means operatively associated with the gyroscope for rotating the latter at a speed proportional to the speed of the frame, a member subjected to a variable force and opposed by force produced by the gyroscope, means associated with said first named means and actuated by said member for controlling the speed of rotation of said frame for maintaining said forces in balance, and means for integrating the revolutions of said frame operatively associated with the frame.

8. A meter comprising a rotatable frame, means for rotating said frame, a gyroscope operatively mounted upon said frame and arranged for producing a gyroscopic force, means operatively associated with the gyroscope for rotating the latter at a speed proportional to the speed of the frame, a member subjected to a variable force and opposed by force produced by the gyroscope, means associated with said first named means and actuated by said member for controlling the speed of rotation of said frame for maintaining said forces in balance, and recording means operatively associated with the frame and adapted for recording the revolutions per unit of time of the frame.

9. A meter comprising a rotatable frame, means for rotating said frame, a gyroscope operatively mounted upon said frame and arranged for producing a gyroscopic force, means operatively associated with the gyroscope for rotating the latter at a speed proportional to the speed of the frame, a member subjected to a variable force and opposed by force produced by the gyroscope, means associated with said first named means and actuated by said member for controlling the speed of rotation of said frame for maintaining said forces in balance, an electric circuit, means included in said circuit and actuated by a part actuated by the rotation of said frame for opening and closing said circuit upon each revolution of said frame, and a device located at a distance from the frame and included in said circuit and adapted to be actuated by the opening and closing of said circuit.

10. A meter for measuring the flow of a fluid flowing in a conduit comprising a differential pressure producing device mounted in said conduit, a casing, means connecting the casing to said device at points of differential pressure, a differential fluid pressure responsive part within said casing and actuated by differential pressure produced by said device, a rotatable frame, a housing upon which the frame is mounted, a gyroscope mounted upon said frame, means actuated by the rotation of the frame and arranged for rotating the gyroscope, a lever mounted upon said frame, means operatively associated with said pressure responsive part for applying a force produced by the differential pressure and tending to move the lever in one direction, means operatively associated with the gyroscope and the lever and tending to move the lever in the opposite direction by the force produced by the gyroscope, means actuated by said part and arranged for controlling the speed of rotation of said frame, and means operatively connected with said frame and responsive to the number of revolutions of said frame.

11. A meter for measuring the flow of a fluid flowing in a conduit comprising a differential pressure producing device mounted in said conduit, a casing, means connecting the casing to said device at points of differential pressure, a differential fluid pressure responsive part within said casing and actuated by differential pressure produced by said device, a rotatable frame, a housing upon which the frame is mounted, a gyroscope mounted upon said frame, means actuated by the rotation of the frame and arranged for rotating the gyroscope, a lever mounted upon said frame, means operatively associated with said pressure responsive part for applying a force produced by the differential pressure and tending to move the lever in one direction, means operatively associated with the gyroscope and the lever and tending to move the lever in the opposite direction by the force produced by the gyroscope, means actuated by said part and arranged for controlling the speed of rotation of said frame, an electric circuit, means included in said circuit and actuated by a part actuated by the rotation of said frame for opening and closing said circuit upon each revolution of said frame, and means located at a distance from the frame and included in said circuit and responsive to the revolutions of the frame.

12. A meter comprising a housing, a frame rotatably mounted upon the housing, means for rotating the frame, a casing rotatably mounted upon the frame and upon an axis at right angles to the axis of rotation of the frame, a shaft mounted upon the casing and rotatable upon an axis at right angles to the axes of the frame and the casing, means for rotating the shaft at a speed proportional to the speed of the frame, a wheel secured upon said shaft and adapted to produce a force tending to tilt the casing about its pivotal axis upon the frame, a member subjected to a variable force and opposed by said force tending to tilt the casing about its pivotal axis upon the frame, and means associated with said first named means and actuated by said member and arranged for controlling the speed of rotation of the frame.

13. A meter comprising a housing, a frame rotatably mounted upon the housing, means for rotating the frame, a casing rotatably mounted upon the frame and upon an axis at right angles to the axis of rotation of the frame, a shaft mounted upon the casing and rotatable upon an axis at right angles to the axes of the frame and the casing, means driven by the rotation of the frame and arranged for rotating the shaft, a wheel secured upon said shaft and adapted to produce a force tending to tilt the casing about its pivotal axis upon the frame, a member subjected to a variable force and opposed by said force tending to tilt the casing about its pivotal axis upon the frame, and means associated with said first named means and actuated by said member and arranged for controlling the speed of rotation of the frame.

14. A meter comprising a housing, a frame rotatably mounted upon the housing, means for rotating the frame, a casing rotatably mounted upon the frame and upon an axis at right angles to the axis of rotation of the frame, a shaft mounted upon the casing and rotatable upon an axis at right angles to the axes of the frame and the casing, a gear wheel secured upon said shaft, a gear wheel secured upon the housing, said gear wheels intermeshing and arranged for rotating the shaft when the frame is rotated, a wheel secured upon said shaft and adapted to produce a force tending to tilt the casing about its pivotal axis upon the frame, a member subjected to a variable force and opposed by said force tending to tilt the casing about its pivotal axis upon the frame, and means associated with said first named means and actuated by said member and arranged for controlling the speed of rotation of the frame.

15. A fluid meter comprising a first named means for causing a differential pressure proportional to the square of the rate of flow of fluid, a second means responsive to the differential produced by said first means, a rotatable frame, means for rotating the frame, a gyroscope operatively mounted upon said frame, means operatively associated with the gyroscope for rotating the latter at a speed proportional to the speed of the frame, said gyroscope adapted to exert a force on said second means in opposition to the force due to the differential pressure, a movable member controlled jointly by said second means and the force produced by the gyroscope, means associated with said means for rotating the frame and said movable member adapted to vary the speed of the frame to balance said forces on the second means, an adjustable counter balance operatively associated with said movable member, and a device operatively associated with said frame and responsive to the rotations of said frame.

16. A meter for measuring the flow of fluid in a conduit, a differential pressure producing device mounted in said conduit, a pressure responsive device having a member movable by the differential pressure produced by said first named device, a rotatable frame, means for rotating the frame, a gyroscope operatively mounted upon said frame, means operatively associated with the gyroscope for rotating the latter at a speed proportional to the speed of the frame, said gyroscope adapted to exert a force on said movable member in opposition to the force produced by the differential pressure, and an adjustable counter balance operatively associated with the movable member for compensating for the shape of the co-efficient curve of said differential pressure producing device.

17. A meter for measuring the flow of fluid in a conduit, a differential pressure producing device mounted in said conduit in which the flow is proportional to the square root of the differential pressure, a pressure responsive device connected with said pressure producing device, said pressure responsive device including a movable member actuated by differential pressure produced by said first named device, a pull rod operatively associated with said movable member, a rotatable frame, means for rotating the frame, a gyroscope operatively mounted upon said frame, means operatively associated with the gyroscope for rotating the latter at a speed proportional to the speed of the frame, said gyroscope adapted to exert a force on said pull rod in opposition to the force produced by the differential pressure, a lever pivotally associated with said rod, an adjustable weight upon said lever for compensating for the weight of the rod and the movable member and for the shape of the co-efficient curve of said differential pressure producing device, and a device responsive to the rotations of the frame and operatively associated with the frame.

18. A fluid meter comprising a rotatable frame, a motor for rotating the frame, means associated with said motor for controlling the speed of rotation of the motor comprising a gyroscope operatively mounted upon the frame and arranged to produce a gyroscopic force, means operatively associated with the gyroscope for rotating the latter at a speed proportional to the speed of the frame, structure subjected to a force substantially proportional to the square of the rate of flow of a fluid opposing the force produced by the gyroscope, and a device responsive to the revolutions of the motor and operatively associated with the frame.

19. A meter comprising a rotatable frame, a motor for rotating the frame, a gyroscope operatively mounted upon said frame and arranged to produce a gyroscopic force, means operatively associated with the gyroscope for rotating the latter at a speed proportional to the speed of the frame, a member subjected to a variable force and opposed by force produced by the gyroscope, an electric circuit including said motor, and a switch included in said circuit and actuated by said member for controlling the speed of the motor.

20. A meter comprising a rotatable frame, a motor for rotating the frame, a gyroscope operatively mounted upon said frame and arranged to produce a gyroscopic force, means operatively associated with the gyroscope for rotating the latter at a speed proportional to the speed of the frame, a member subjected to a variable force and opposed by force produced by the gyroscope, an electric circuit including said motor, a switch included in said circuit and actuated by said member for controlling the speed of the motor, and means responsive to the revolutions of the frame.

21. A meter comprising a rotatable frame, a motor for rotating the frame, a gyroscope operatively mounted upon said frame and arranged to produce a gyroscopic force, means operatively associated with the gyroscope for rotating the latter at a speed proportional to the speed of the frame, a member subjected to a variable force and opposed by force produced by the gyroscope, an electric circuit including said motor, a switch included in said circuit and actuated by said member for controlling the speed of the motor, an indicating and recording device, means rotating at a uniform speed actuating said device, and means operatively associated with said frame and co-operating with said means rotating at a uniform speed and arranged for operating said device responsive to the revolutions of said frame.

22. A fluid meter comprising a rotatable frame, a motor, a clutch, means for engaging the clutch for rotating the frame comprising a gyroscope operatively mounted upon the frame and arranged to produce a gyroscopic force, means operatively associated with the gyroscope for rotating the latter at a speed proportional to the speed of the frame, structure subjected to a force substantially proportional to the square of the rate of flow of a fluid opposing the force produced by the gyroscope, and a device responsive to the revolutions of the frame and operatively associated with the latter.

23. A meter comprising a housing, a frame rotatably mounted upon the housing, a motor mounted upon the housing, a clutch operatively associated with the motor and the frame, a member subjected to a variable force, means operatively associated with said member and the clutch and arranged for engaging the clutch and causing rotation of the frame, a gyroscope operatively mounted upon the frame and arranged to produce a gyroscopic force, means operatively associated with the gyroscope for rotating the latter at a speed proportional to the speed of the frame, and means operatively associated with the gyroscope and with said means for engaging the clutch and arranged to oppose the variable force applied by said member by the force produced by the gyroscope for releasing the clutch and reducing the speed of rotating of said frame.

24. A meter comprising a housing, a frame rotatably mounted upon the housing, a motor mounted upon the housing, a clutch operatively associated with the motor and the frame, a member subjected to a variable force, a pull rod operatively associated with said member and the clutch and arranged for engaging the clutch and causing rotation of the frame, a gyroscope operatively mounted upon the frame and arranged to produce a gyroscopic force, means operatively associated with the gyroscope for rotating the latter at a speed proportional to the speed of the frame, and means operatively associated with the gyroscope and with said pull rod and arranged to oppose the variable force applied by said member by the force produced by the gyroscope for releasing the clutch and reducing the speed of rotation of said frame.

25. A meter comprising a housing, a frame rotatably mounted upon the housing, a motor mounted upon the housing, a clutch operatively associated with the motor and the frame, a member subjected to a variable force, means operatively associated with said member and the clutch and arranged for engaging the clutch and causing rotation of the frame, a gyroscope operatively mounted upon the frame and arranged to produce a gyroscopic force, means operatively associated with the gyroscope for rotating the latter at a speed proportional to the speed of the frame, means operatively associated with the gyroscope and with said means for engaging the clutch and arranged to oppose the variable force applied by said member by the force produced by the gyroscope for releasing the clutch and reducing the speed of rotation of said frame, an integrating device and gearing operatively associated with the frame and said device.

26. A meter comprising a housing, a frame rotatably mounted upon the housing, a motor mounted upon the housing, a clutch operatively associated with the motor and the frame, a member subjected to a variable force, means operatively associated with said member and the clutch and arranged for engaging the clutch and causing rotation of the frame, a gyroscope operatively mounted upon the frame and arranged to produce a gyroscopic force, means operatively associated with the gyroscope for rotating the latter at a speed proportional to the speed of the frame, means operatively associated with the gyroscope and with said means for engaging the clutch and arranged to oppose the variable force applied by said member by the force produced by the gyroscope for releasing the clutch and reducing the speed of rotation of said frame, gearing connected to the motor, a recording sheet movable at a constant speed by said gearing, an indicating pointer, means upon the pointer for marking upon said sheet, mechanism arranged for moving the pointer relatively to said sheet, and including gearing upon said frame and co-operating with said gearing connected to the motor and arranged for actuating the pointer relatively to the speed of rotation of the frame.

27. A fluid meter comprising a rotatable frame, a motor, a drum connected with the motor, a clutch including a snubbing band embracing the drum and arranged for rotating the frame, a gyroscope operatively mounted upon the frame and arranged to produce a gyroscopic force for controlling the engaging of the band and drum, means operatively associated with the gyroscope for rotating the latter at a speed proportional to the speed of the frame, structure subjected to a force substantially proportional to the square of the rate of flow of a fluid opposing the force produced by the gyroscope, and a device responsive to the revolutions of the frame and operatively associated with the latter.

28. A meter comprising a housing, a frame rotatably mounted upon the housing, a motor, means mounting the motor upon the housing, a drum located within the frame and rotatable by the motor, a clutch disk engageable with the drum, a snubbing band embracing the drum, means attaching one end of said band to the disk and its opposite end to said frame, a pull rod arranged for moving the disk, a member subjected to a variable force, means attaching the pull rod to said member for causing engagement of the disk with the drum for rotating said frame, a gyroscope operatively mounted upon said frame and arranged to produce a gyroscopic force, means operatively associated with the gyroscope for rotating the latter at a speed proportional to the speed of the frame, means operatively associated with the gyroscope and the pull rod and arranged to oppose the variable force applied by said member by the force produced by the gyroscope for releasing the disk from the drum and reducing the speed of rotation of said frame, and indicating means operatively associated with said frame for indicating the speed of the latter.

29. A meter comprising a housing, a frame rotatably mounted upon the housing, a motor, means mounting the motor upon the housing, a drum located within the frame and rotatable by the motor, a clutch disk engageable with the drum, a pull rod arranged for engaging the disk with the drum, an arm secured to said clutch disk, a snubbing band embracing the drum, means attaching one end of said band to the arm and its opposite end to said frame, a member subjected to a variable force, means attaching the pull rod to said member for causing engagement of the disk with the drum for causing rotation of said frame, a gyroscope operatively mounted upon said frame and arranged to produce a gyroscopic force, means operatively associated with the gyroscope for rotating the latter at a speed proportional to the speed of the frame, means operatively associated with the gyroscope and the pull rod and arranged to oppose the variable force applied by said member by the force produced by the gyroscope for releasing the disk from the drum and reducing the speed of rotation of said frame, and recording means operatively associated with said frame for recording the speed of the latter.

30. A meter comprising a housing, a frame rotatably mounted upon the housing, a motor, means mounting the motor upon the housing, a hollow drum located within the frame and rotatable by the motor, a clutch disk located within the drum and engageable with the latter, a pull rod, a collar secured upon the pull rod, a spring interposed between the collar and said disk, a sleeve upon said disk and slidably mounted upon said rod, an arm secured to the sleeve, a snubbing band embracing the drum, means attaching one end of said band to the arm and its opposite end to said frame, a member subjected to a variable force, means attaching the pull rod to said member and arranged for applying a force to said rod for causing rotation of the frame, a gyroscope operatively mounted upon said frame and arranged to produce a gyroscopic force, means operatively associated with the gyroscope for rotating the latter at a speed proportional to the speed of the frame, means operatively associated with the gyroscope and the pull rod and arranged to oppose the variable force applied by said member by the force produced by the gyroscope for releasing the disk from the drum and reducing the speed of rotation of said frame, and integrating means operatively associated with said frame for integrating the revolutions of the latter.

31. A meter comprising a housing, a frame rotatably mounted upon the housing, a motor, means mounting the motor upon the housing, a drum located within the frame and rotatable by the motor, a clutch disk engageable with the drum, a snubbing band embracing the drum, means attaching one end of said band to the disk and its opposite end to said frame, a pull rod arranged for moving the disk, a member subjected to a variable force, means attaching the pull rod to said member for causing engagement of the disk with the drum for causing rotation of said frame, a lever pivotally mounted upon the frame, means engaging the pull rod with the lever, a gyroscope operatively mounted upon said frame and arranged to produce a gyroscopic force, means operatively associated with the gyroscope for rotating the latter at a speed proportional to the speed of the frame, means operatively associated with the gyroscope and the lever and arranged to oppose the variable force applied by said member by the force produced by the gyroscope for releasing the disk from the drum and reducing the speed of rotation of said frame, and indicating means operatively associated with said frame for indicating the speed of the latter.

32. A meter comprising a housing, a frame rotatably mounted upon the housing, means for rotating the frame, a casing rotatably mounted upon the frame upon an axis at right angles to the axis of rotation of the frame, a shaft mounted upon the casing and rotatable upon an axis at right angles to the axes of the frame and the casing, a gear wheel secured upon said shaft, a sleeve secured upon the housing and located upon the axis upon which the frame is rotatable, a gear wheel secured upon said sleeve and in mesh with the first mentioned gear wheel for rotating said shaft, a wheel secured upon said shaft and adapted to produce a force tending to tilt the casing about its pivotal axis upon the frame, a member subjected to a variable force and opposed by said force tending to tilt the casing about its pivotal axis upon the frame, and means associated with said first named means and actuated by said member and arranged for controlling the speed of rotation of the frame.

33. A meter comprising a housing, a frame rotatably mounted upon the housing, means for rotating the frame, a casing rotatably mounted upon the frame upon an axis at right angles to the axis of rotation of the frame, a shaft mounted upon the casing and rotatable upon an axis at right angles to the axes of the frame and the casing, a gear wheel secured upon said shaft, a sleeve secured upon the housing and located upon the axis upon which the frame is rotatable, a gear wheel secured upon said sleeve and in mesh with the first mentioned gear wheel for rotating said shaft, a wheel secured upon said shaft and adapted to produce a force tending to tilt the casing about its pivotal axis upon the frame, stop members adjustably mounted upon the frame and positioned to limit the tilting of the casing relatively to the frame, a member subjected to a variable force and opposed by said force tending to tilt the casing about its pivotal axis upon the frame.

34. A meter comprising a housing, a frame rotatably mounted upon the housing, means for rotating the frame, a casing rotatably mounted upon the frame upon an axis at right angles to the axis of rotation of the frame, a shaft mounted upon the casing and rotatable upon an axis at right angles to the axes of the frame and the casing, a gear wheel secured upon said shaft, a sleeve secured upon the housing and located upon the axis upon which the frame is rotatable, a gear wheel secured upon said sleeve and in mesh with the first mentioned gear wheel for rotating said shaft, a wheel secured upon said shaft and adapted to produce a force tending to tilt the casing about its pivotal axis upon the frame, a pull rod located adjacent to the axis of the frame and extending freely through the last mentioned sleeve and through the casing, sleeves adjustably mounted upon the casing and loosely embracing the pull rod, said pull rod subjected to a variable force and opposed by said first mentioned force tending to tilt the casing about its pivotal axis upon the frame, and means associated with said first named means and actuated by said pull rod and arranged for controlling the speed of rotation of the frame.

35. A meter comprising a housing, a frame rotatably mounted upon the housing, means for rotating the frame, a casing rotatably mounted upon the frame and upon an axis at right angles to the axis of rotation of the frame, a shaft mounted upon the casing and rotatable upon an axis at right angles to the axes of the frame and the casing, means driven by the rotation of the frame and arranged for rotating the shaft, wheels secured upon said shaft and adapted to produce a force tending to tilt the casing about its pivotal axis upon the frame, means upon the casing and arranged for adjustably positioning the shaft axially within the casing for locating said wheels relatively to the axis of the frame upon the housing, a member subjected to a variable force and opposed by said force tending to tilt the casing about its pivotal axis upon the frame, and means associated with said first named means and actuated by said member and arranged for controlling the speed of rotation of the frame.

36. A meter comprising a housing, a frame rotatably mounted upon the housing, means for rotating the frame, a casing rotatably mounted upon the frame and upon an axis at right angles to the axis of rotation of the frame, a shaft mounted upon the casing and rotatable upon an axis at right angles to the axes of the frame and the casing, means driven by the rotation of the frame and arranged for rotating the shaft, a wheel secured upon said shaft and adapted to produce a force tending to tilt the casing about its pivotal axis upon the frame, a bushing adjustably mounted upon the casing and arranged for axially adjusting the position of said shaft relatively to the casing, a member subjected to a variable force and opposed by said force tending to tilt the casing about its pivotal axis upon the frame, and means associated with said first named means and actuated by said member and arranged for controlling the speed of rotation of the frame.

37. A meter comprising a housing, a frame rotatably mounted upon the housing, means for rotating the frame, a casing rotatably mounted upon the frame and upon an axis at right angles to the axis of rotation of the frame, a shaft mounted upon the casing and rotatable upon an axis at right angles to the axes of the frame and the casing, means driven by the rotation of the frame and arranged for rotating the shaft, a wheel secured upon said shaft and adapted to produce a force tending to tilt the casing about its pivotal axis upon the frame, bushings upon the casing and embracing said shaft, means adjustably mounting said bushings upon the casing relatively to the length of the shaft, means securing said shaft against longitudinal movement relatively to one of said bushings, means slidably mounting the other one of said bushings upon the shaft and adapted to permit of the adjustment of the position of the last mentioned bushing upon the casing relatively to the pivotal axis of the casing upon the frame, a member subjected to a variable force and opposed by said force tending to tilt the casing about its pivotal axis upon the frame, and means associated with said first named means and actuated by said member and arranged for controlling the speed of rotation of the frame.

38. A meter comprising a housing, a frame rotatably mounted upon the housing, means for rotating the frame, a casing rotatably mounted upon the frame and upon an axis at right angles to the axis of rotation of the frame, a shaft mounted upon the casing and rotatable upon an axis at right angles to the axes of the frame and the casing, means driven by the rotation of the frame and arranged for rotating the shaft, a wheel secured upon the shaft and adapted to produce a force tending to tilt the casing about its pivotal axis upon the frame, weight members adjustably mounted upon opposite sides of the casing and positioned adjacent to a line extending through the intersection of the axis of the shaft and the axis on which the casing is pivoted upon the frame and arranged for varying the mass moment of inertia of the casing about the axis upon which the casing is rotatable on the frame and the axis of said shaft, a member subjected to a variable force and opposed by said force tending to tilt the casing about its pivotal axis upon the frame, and means associated with said first named means and actuated by said member and arranged for controlling the speed of rotation of the frame.

39. A meter comprising a housing, a frame rotatably mounted upon the housing, means for rotating the frame, a casing rotatably mounted upon the frame and upon an axis at right angles to the axis of rotation of the frame, a shaft mounted upon the casing and rotatable upon an axis at right angles to the axes of the frame and the casing, means driven by the rotation of the frame and arranged for rotating the shaft, a wheel secured upon the shaft and adapted to produce a force tending to tilt the casing about its pivotal axis upon the frame, weight members adjustably mounted upon opposite sides of the casing and positioned adjacent to a line extending through the intersection of the axis of the shaft and the axis on which the casing is pivoted upon the frame and arranged for varying the mass moment of inertia of the casing about the axis upon which the casing is rotatable on the frame and the axis of said shaft, a weight member adjustably mounted upon the casing and positioned adjacent to the axis of said shaft and adjustable parallel with the axis of said shaft for varying the center of gravity of the casing relatively to the axis on which the casing is pivoted upon the frame, a member subjected to a variable force and opposed by said force tending to tilt the casing about its pivotal axis upon the frame, and means associated with said first named means and actuated by said member and arranged for controlling the speed of rotation of the frame.

40. A meter comprising a housing, a frame rotatably mounted upon the housing, means for rotating the frame, a casing rotatably mounted upon the frame and upon an axis at right angles to the axis of rotation of the frame, a shaft mounted upon the casing and rotatable upon an axis at right angles to the axes of the frame and the casing, means driven by the rotation of the frame and arranged for rotating the shaft, a wheel secured upon the shaft and adapted to produce a force tending to tilt the casing about its pivotal axis upon the frame, a pull rod positioned parallel and adjacent to the axis upon which the frame is rotatable upon the housing, said pull rod subjected to a variable force, means operatively associating the pull rod with the casing whereby the variable force applied to the pull rod is opposed by said force tending to tilt the casing about its pivotal axis upon the frame, and means associated with said first named means and actuated by the pull rod and arranged for controlling the speed of rotation of the frame.

41. A meter comprising a housing, a frame rotatably mounted upon the housing, means for rotating the frame, a casing rotatably mounted upon the frame and upon an axis at right angles to the axis of rotation of the frame, a shaft mounted upon the casing and rotatable upon an axis at right angles to the axes of the frame and the casing, means driven by the rotation of the frame and arranged for rotating the shaft, a wheel secured upon the shaft and adapted to produce a force tending to tilt the casing about its pivotal axis upon the frame, a pull rod positioned parallel and adjacent to the axis upon which the frame is rotatable upon the housing, said pull rod subjected to a variable force, a lever pivotally mounted upon the frame, means upon said rod in engagement with the lever for moving the lever in one direction, means operatively associated with the casing and the lever whereby the variable force applied to said rod is opposed by said force tending to tilt the casing about its pivotal axis upon the frame, and means associated with said first named means and actuated by the said rod and arranged for controlling the speed of rotation of the frame.

42. A meter comprising a housing, a frame rotatably mounted upon the housing, means for rotating the frame, a casing rotatably mounted upon the frame and upon an axis at right angles to the axis of rotation of the frame, a shaft mounted upon the casing and rotatable upon an axis at right angles to the axes of the frame and the casing, means driven by the rotation of the frame and arranged for rotating the shaft, a wheel secured upon the shaft and adapted to produce a force tending to tilt the casing about its pivotal axis upon the frame, a pull rod positioned parallel and adjacent to the axis upon which the frame is rotatable upon the housing, said rod subjected to a variable force, a lever pivotally mounted upon the frame, means upon said rod in engagement with the lever for moving the lever in one direction, a stud shaft secured upon the casing, a bar mounted between the stud shaft and the lever through which bar the variable force applied to said rod is opposed by said force tending to tilt the casing about its pivotal axis upon the frame, and means associated with said first named means and actuated by said rod and arranged for controlling the speed of rotation of the frame.

43. A meter comprising a housing, a frame rotatably mounted upon the housing, means for rotating the frame, a casing comprising a hollow body portion, end walls detachably secured upon the body portion, pivot shafts upon the frame and pivotally mounting the casing for rotation about an axis at right angles to the axis of rotation of the frame upon the housing, a shaft within the casing and mounted upon said end walls and rotatable upon an axis at right angles to the axes of the frame and the casing, means driven by the rotation of the frame and arranged for rotating said shaft within the casing, a wheel secured upon the shaft within the casing and adapted to produce a force tending to tilt the casing about its pivotal axis upon the frame, a pull rod positioned parallel and adjacent to the axis of the frame and said rod subjected to a variable force, a lever pivotally mounted upon the frame, means upon said rod in engagement with the lever, a stud shaft secured upon one of said end walls and positioned in alignment with the shaft within the casing, a bar mounted between the stud shaft and the lever through which bar the variable force applied to said rod is opposed by said force tending to tilt the casing about its pivotal axis upon the frame, and means associated with said first named means and actuated by said rod and arranged for controlling the speed of rotation of the frame.

44. A meter comprising a housing, a frame rotatably mounted upon the housing, means for rotating the frame, a casing comprising a body portion, end walls detachably secured upon the body portion, pivot shafts upon the frame and pivotally mounting the casing for rotation about an axis at right angles to the axis of rotation of the frame upon the housing, a shaft within the casing and mounted upon said end walls and rotatable upon an axis at right angles to the axes of the frame and the casing, means driven by the rotation of the frame and arranged for rotating said shaft within the casing, a wheel secured upon the shaft within the casing and adapted to produce a force tending to tilt the casing about its pivotal axis upon the frame, a pull rod positioned parallel and adjacent to the axis of the frame and said rod subjected to a variable force, a lever pivotally mounted upon the frame, means upon said rod in engagement with the lever, a stud shaft secured upon one of said end walls, a bar mounted between the stud shaft and the lever through which bar the variable force applied to said rod is opposed by said force tending to tilt the casing about its pivotal axis upon the frame, means upon the stud shaft for adjustably locating the point of attachment of the bar upon the stud shaft relatively to the pivotal axis of the casing upon the frame, and means associated with said first named means and actuated by said rod and arranged for controlling the speed of rotation of the frame.

EMORY FRANK STOVER.